F. M. ROUSH.
AUTOMOBILE TOP RAISING AND LOWERING DEVICE.
APPLICATION FILED OCT. 25, 1915.
1,186,337.
Patented June 6, 1916.
2 SHEETS—SHEET 1.
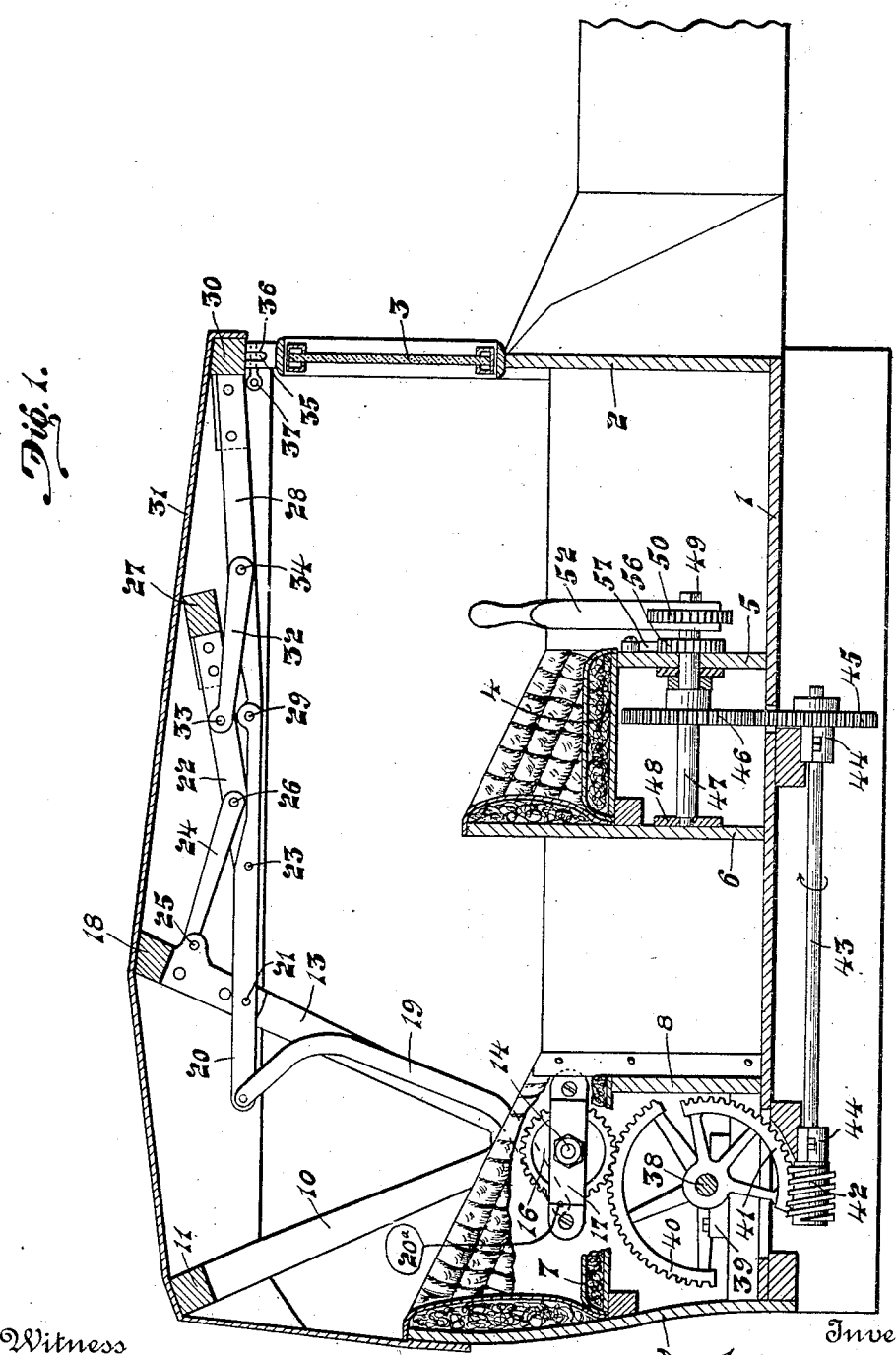
Witness
Robert O. Karcher.
Inventor
Francis M. Roush.
By F. W. Bond
Attorney

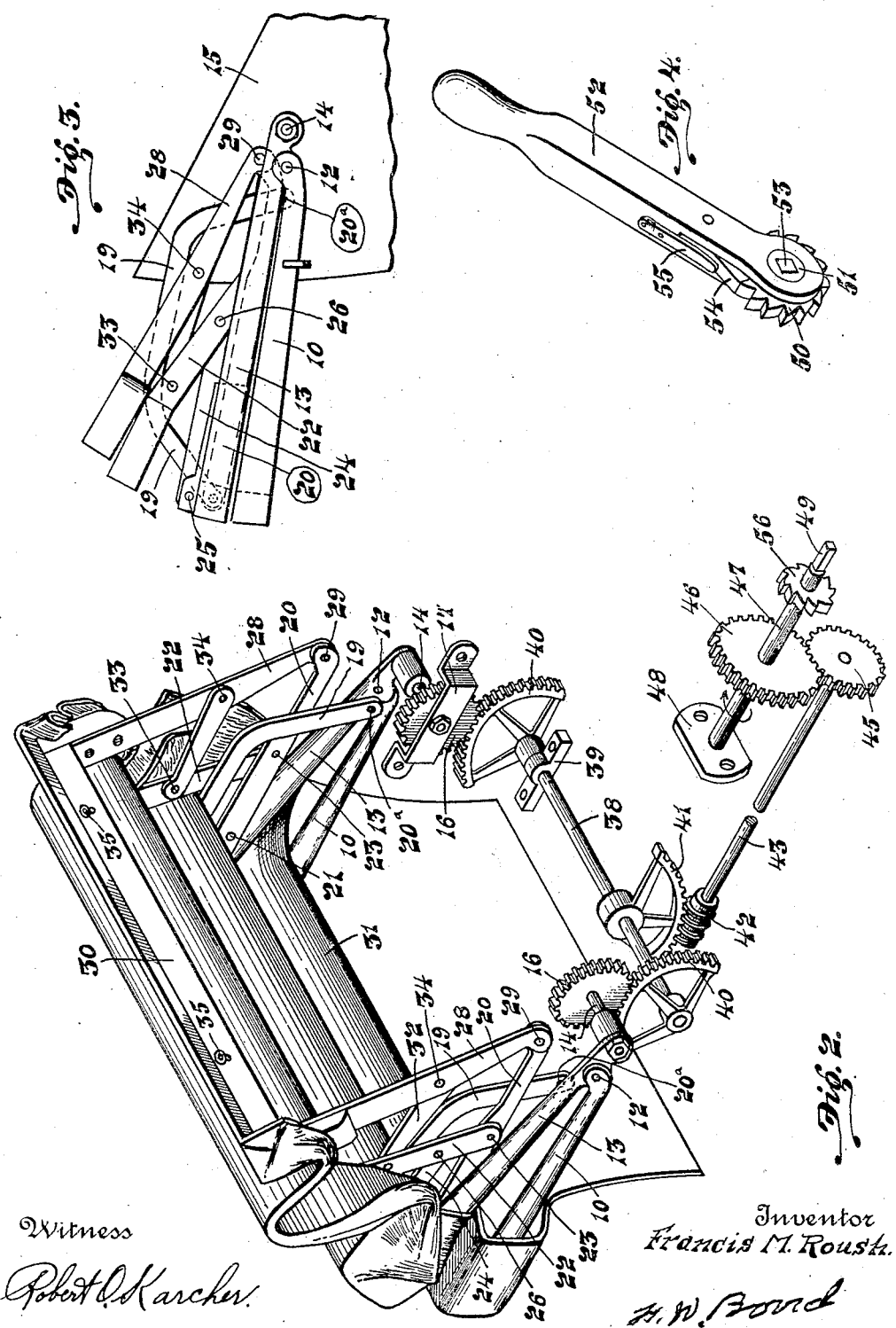

UNITED STATES PATENT OFFICE.

FRANCIS M. ROUSH, OF CANTON, OHIO, ASSIGNOR OF ONE-HALF TO ERVIN RUTTER, OF DETROIT, MICHIGAN.

AUTOMOBILE-TOP RAISING AND LOWERING DEVICE.

1,186,337. Specification of Letters Patent. Patented June 6, 1916.

Application filed October 25, 1915. Serial No. 57,639.

*To all whom it may concern:*

Be it known that I, FRANCIS M. ROUSH, a citizen of the United States, residing at Canton, in the county of Stark and State of Ohio, have invented a new and useful Automobile-Top Raising and Lowering Device, of which the following is a specification.

My invention relates to automobile top raising and lowering devices and has more especial reference to a device of this character by means of which the top may be quickly raised or lowered.

The object of the present invention is to provide a device of the character described with mechanical means by which the automobile top may be quickly and easily raised or lowered with a minimum amount of work and exertion by the operator.

A further object is to provide means whereby the top may be rigidly held in the open or closed position.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

In the accompanying drawings: Figure 1 is a longitudinal sectional view through the body portion of an automobile showing my improved device applied thereto, showing the top in the raised position. Fig. 2 is a perspective view of the top and operating means showing the top in the partially lowered position. Fig. 3 is a side elevation of the top bows and folding frame in the folded position. Fig. 4 is a detail perspective view of the operating handle.

Similar numerals of reference indicate corresponding parts throughout the several figures of the drawings.

Referring more especially to the construction illustrated in the accompanying drawings, the numeral 1 indicates the floor of an automobile body, the numeral 2 the dash or instrument board and the numeral 3 the usual wind shield. The front seat 4 is supported upon the usual front and back supports 5 and 6 and the rear seat 7 is supported by the usual front support 8 and the back 9 of the body of the machine.

The rear or lowermost bow 10 upon each side is connected to the usual brace 11 at its upper extremity, the lower extremities of said bows being pivotally connected at 12 to the forward or upper bows 13, said last named bows being rigidly connected to short shafts 14, each of said shafts 14 having a bearing in the side portion 15 of the body of the automobile. A gear 16 is fixedly mounted upon each of the shafts 14 and the inner extremities of said shafts are journaled within suitable brackets 17, carried upon the inner face of the side wall of the body of the automobile.

The usual brace 18 connects the upper extremities of the forward or uppermost bows 13. An angular arm 19 is pivotally connected at 20ª upon each of the side members 15 of the body and to the upper extremity of each of said arms is pivotally connected a lever 20, which controls the operation of the folding frame work which supports the forward portion of the vehicle top. The lever 20 is pivoted at 21 upon the bow 13 and the lower extremity of an arm 22 is pivoted at 23 upon said lever, a link 24 being pivotally connected to each of the bows 13 at 25 and to each of the arms 22 at 26. The arms 22 are connected at their upper extremities by means of a brace 27. An arm 28 is pivotally connected at 29 at its lower end to the extremity of each of the levers 20, said arms being connected at their upper extremities by means of a brace 30, the forward edge of the vehicle top 31 being connected to said last named brace. A link 32 connects each of the arms 22 with the adjacent arm 28 being pivotally connected thereto at 33 and 34 respectively.

The vehicle top is connected to each of the braces 11, 18, 27 and 30 and the rear extremity of said vehicle top is connected to the rear portion of the body. A pair of eyes 35 are provided upon the under face of the brace 30, said eyes being adapted to be seated in the grooves 36 formed in the upper edge of the frame of the wind shield, pins 37 being adapted to be passed through suitable apertures in said wind shield and through said eyes for the purpose of holding the top in the raised or opened position.

A shaft 38 is located beneath and parallel with the short shafts 14, said shaft being journaled in suitable bearings 39 carried upon the floor of the automobile body. A pair of gear segments 40 are fixedly mounted upon said shaft 38 and mesh with the gears 16. A worm segment 41 is fixedly mounted upon said shaft 38 and meshes with a worm 42 carried upon the shaft 43, said shaft being journaled in suitable bearings 44 carried beneath the floor of the car body. A gear 45 is carried upon the forward extremity of the shaft 43 and meshes with a large gear 46 carried upon the short shaft 47, which shaft is located above and parallel with the shaft 43 and is journaled through the forward support 5 of the front seat, the rear extremity of said shaft being journaled in a suitable bearing 48 carried upon the rear support of said seat. The forward extremity of the shaft 47 is squared as indicated at 49 in order that a suitable implement such as the ratchet device, shown in Fig. 4, may be applied thereto for the purpose of rotating said shaft. This device comprises the usual ratchet wheel 50 provided with bosses 51 journaled in the bifurcated extremities of the lever 52. A squared socket 53 is provided through the ratchet wheel for the purpose of engaging the squared extremity of the shaft and a pawl 54 is pivoted within the lever 52 and held in engagement with the ratchet teeth by means of the spring 55. It will be understood of course that this ratchet device will not be permanently carried upon the shaft 47, but will only be applied thereto when it is desired to raise or lower the top and it will be further understood that by reversing the ratchet the forward and reverse operations of the mechanism above described, necessary for raising and lowering the top are obtained. A ratchet wheel 56 is fixedly mounted upon the shaft 47 adjacent the outer face of the support 5 and a pawl 57 is mounted upon said support adjacent said ratchet and adapted to engage the same when the top is in the lowered position for the purpose of holding the parts rigidly in said position.

Assuming that the top is in the folded or lowered position, in order to raise the top into the open position, the ratchet device illustrated in Fig. 4, or a crank or other suitable implement is applied to the squared portion 49 of the shaft 47 and operated to rotate the shaft 47 in the direction of the arrow shown thereon in Fig. 2. Thus through the gears 45 and 46, the shaft 43 and worm 42, carried thereon, are rotated in the opposite direction, said worm, by means of the worm segment 41, rotating the shaft 38 into the position illustrated in Fig. 1, the gear segments 40 mounted upon said shaft coacting with the gears 16 upon the short shafts 14 and raising the bows 13 into the position shown in Fig. 1. By reason of the angular arms 19 being connected to the bows 13 by the levers 20, said angular arms are moved into the raised position and through said bows 20 and the link connections 24 and 32 move the top supporting arm 22 and 28 into the extended position. As the forward portion of the top is extended the bows 10, being connected to said top will be raised into the position shown in Fig. 1. When the top has been fully extended the brace 30 will be located adjacent the upper edge of the frame of the windshield 3, and the eyes 35 carried upon said brace may be seated within the grooves 36 provided in the windshield frame, and the pins 37 passed through said eyes, thus holding the top firmly in the raised position.

When it is desirous to lower the top, the pins 37 are first moved out of engagement with the eyes 35. The ratchet device or other implement may then be placed upon the squared portion of the shaft 47 and operated to rotate said saft in a direction opposite from that above described, thus lowering the bows into the position shown in Fig. 3, and folding the folding frame into the position illustrated in said figure. When the top is thus located in the lowered position the pawl 57 may be dropped into engagement with the ratchet 56 thus holding all of the parts firmly and securely in the lowered position, the bows 10 resting upon the rests 58.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. In a device of the character described, in combination with a vehicle body, a folding top, a shaft journaled in each side of said body, a bow fixedly mounted upon each of said shafts, a brace carried between said bows and attached to the folding top, a second bow pivotally mounted upon each of said first named bows, a second brace carried between said second named bows, and attached to said folding top near the rear thereof, a lever pivotally mounted intermediate its extremities upon each of said first named bows, an angular arm pivotally connected to said vehicle body at a point adjacent each of said shafts and to each of said levers, said angular arms being arranged to lie in a plane substantially parallel to said first mentioned bows when the top is in the opened position, an arm pivotally connected to each of said levers, a third brace carried between said arms and attached to the forward portion of said folding top, a link connecting each of said arms to the adjacent first named bow, and means for rotating said shafts.

2. In a device of the character described, in combination with a vehicle body, a folding top, a shaft journaled in each side of said body, a bow fixedly mounted upon each of said shafts, a brace carried between said bows and attached to the folding top, a lever pivotally mounted intermediate its extremities upon each of said bows, an angular arm pivotally connected to said vehicle body at a point adjacent each of said shafts and to each of said levers, said angular arms being arranged to lie in a plane substantially parallel to said first mentioned bows when the top is in the opened position, an arm pivotally connected to each of said levers, a second brace carried between said arms and attached to the forward portion of said folding top, a link connecting each of said arms to the adjacent bow and means for rotating said shafts.

3. In a device of the character described, in combination with a vehicle body, a folding top, a shaft journaled in each side of said body, a bow fixedly mounted upon each of said shafts, a brace carried between said bows and attached to the folding top, a lever pivotally mounted intermediate its extremities upon each of said bows, an angular arm pivotally connected to said vehicle body at a point adjacent each of said shafts and to each of said levers, said angular arms being arranged to lie in a plane substantially parallel to said first mentioned bows when the top is in the opened position, an arm pivotally connected to each of said levers intermediate the extremity thereof, a second brace carried between said arms and attached to the folding top, a second arm pivotally connected to the forward extremity of each of said levers, a third brace carried between said second named arms and attached to the forward edge of said folding top, a link connecting each of said first named arms to the adjacent second named arm, a second link connecting each of said bows with the adjacent first named arm, and means for rotating said shafts.

4. In a device of the character described, in combination with a vehicle body, a folding top, a shaft journaled in each side of said body, a bow fixedly mounted upon each of said shafts, a brace carried between said bows and attached to the folding top, a lever pivotally mounted intermediate its extremities upon each of said bows, an angular arm pivotally connected to said vehicle body at a point adjacent each of said shafts and to each of said levers, said angular arms being arranged to lie in a plane substantially parallel to said first mentioned bows when the top is in the opened position, an arm pivotally connected to each of said levers intermediate the extremity thereof, a second brace carried between said arms and attached to the folding top, a second arm pivotally connected to the forward extremity of each of said levers, a third brace carried between said second named arms and attached to the forward edge of said folding top, a link connecting each of said first named arms to the adjacent second named arm, a second link connecting each of said bows with the adjacent first named arm, means for supporting said third brace from said vehicle body and means for rotating said shafts.

5. In a device of the character described, in combination with a vehicle body having a windshield, a folding top attached at its rear edge to said vehicle body, a shaft journaled in each side of said vehicle body, a bow fixedly mounted upon each of said shafts, a brace carried between said bows and attached to the folding top, a lever pivotally mounted intermediate its extremities upon each of said bows, an angular arm pivotally connected to said vehicle body at a point adjacent each of said shafts and to each of said levers, said angular arms being arranged to lie in a plane substantially parallel to said first mentioned bows when the top is in the opened position, an arm pivotally connected to each of said levers intermediate the extremity thereof, a second brace carried between said arms and attached to the folding top, a second arm pivotally connected to the forward extremity of each of said levers, a third brace carried between said second named arms and attached to the forward edge of said folding top, a link connecting each of said first named arms to the adjacent second named arm, a second link connecting each of said bows with the adjacent first named arm, means for detachably connecting said third named brace to said wind shield and means for rotating said shafts.

6. In a device of the character described, in combination with a vehicle body having a windshield provided with grooves in its upper edge, a folding top attached at its rear edge to said vehicle body, a shaft journaled in each side of said vehicle body, a bow fixedly mounted upon each of said shafts, a brace carried between said bows and attached to the folding top, a second bow pivotally mounted upon each of said first named bows, a second brace carried between said second named bows and attached to said folding top in the rear of said first named brace, a lever pivotally mounted intermediate its extremities upon each of said first named bows, an angular arm pivotally connected to said vehicle body at a point adjacent each of said shafts and to each of said levers, said angular arms being arranged to lie in a plane substantially parallel to said first mentioned bows when the top is in the opened position, an arm pivotally connected to each of said levers intermediate the extremity thereof, a third brace carried between said arms and attached to the folding top forward of said first named brace, a second arm pivotally connected to the forward extremity of each of said levers, a fourth brace carried between said second named arms and attached to the forward edge of said folding top, a link connecting each of said first named arms to the adjacent second named arm, a second link connecting each of said first named bows with the adjacent first named arm, eyes carried upon said fourth named brace and arranged to be seated in the grooves in said windshield and means for rotating said shafts.

In testimony that I claim the above, I have hereunto subscribed my name.

FRANCIS M. ROUSH.

Copies of this patent may be obtained for five cents each, by addressing the "Commissioner of Patents, Washington, D. C."